(12) United States Patent
Giampapa et al.

(10) Patent No.: US 8,881,153 B2
(45) Date of Patent: *Nov. 4, 2014

(54) SPECULATIVE THREAD EXECUTION WITH HARDWARE TRANSACTIONAL MEMORY

(71) Applicant: International Business Machines Corporation, Armonk, NY (US)

(72) Inventors: Mark E. Giampapa, Irvington, NY (US); Thomas M. Gooding, Rochester, MN (US); Raul E. Silvera, Ontario (CA); Kai-Ting Amy Wang, Ontario (CA); Peng Wu, Rochester, NY (US); Xiaotong Zhuang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/801,943

(22) Filed: Mar. 13, 2013

(65) Prior Publication Data

US 2013/0198749 A1 Aug. 1, 2013

Related U.S. Application Data

(63) Continuation of application No. 12/711,352, filed on Feb. 24, 2010, now Pat. No. 8,438,568.

(51) Int. Cl.

| G06F 9/46 | (2006.01) |
|---|---|
| G06F 9/40 | (2006.01) |
| G06F 12/08 | (2006.01) |
| G06F 9/38 | (2006.01) |
| G06F 9/48 | (2006.01) |
| G06F 9/52 | (2006.01) |
| G06F 9/50 | (2006.01) |

(52) U.S. Cl.
CPC ............ *G06F 9/466* (2013.01); *G06F 12/0862* (2013.01); *G06F 9/3842* (2013.01); *G06F 9/4843* (2013.01); *G06F 9/52* (2013.01); *G06F 9/5016* (2013.01); *G06F 9/4881* (2013.01); *G06F 9/467* (2013.01)
USPC ........... 718/100; 718/101; 712/200; 711/100; 711/118; 711/147

(58) Field of Classification Search
None
See application file for complete search history.

(56) References Cited

U.S. PATENT DOCUMENTS

| 2009/0177871 A1 | 7/2009 | Von Praun et al. |
| 2010/0262812 A1 | 10/2010 | Lopez et al. |

(Continued)

OTHER PUBLICATIONS

Tom Knight, "An Architecture for Mostly Functional Languages," 1986, pp. 105-112, ACM.

(Continued)

*Primary Examiner* — Qing Wu
(74) *Attorney, Agent, or Firm* — Owen J. Gamon; James R. Nock

(57) ABSTRACT

In an embodiment, if a self thread has more than one conflict, a transaction of the self thread is aborted and restarted. If the self thread has only one conflict and an enemy thread of the self thread has more than one conflict, the transaction of the self thread is committed. If the self thread only conflicts with the enemy thread and the enemy thread only conflicts with the self thread and the self thread has a key that has a higher priority than a key of the enemy thread, the transaction of the self thread is committed. If the self thread only conflicts with the enemy thread, the enemy thread only conflicts with the self thread, and the self thread has a key that has a lower priority than the key of the enemy thread, the transaction of the self thread is aborted.

20 Claims, 8 Drawing Sheets

(56) References Cited

U.S. PATENT DOCUMENTS

| | | |
|---|---|---|
| 2010/0269102 A1 | 10/2010 | Latorre et al. |
| 2010/0299509 A1 | 11/2010 | Doi et al. |
| 2011/0119525 A1 | 5/2011 | Muralimanohar et al. |

OTHER PUBLICATIONS

Manoj Franklin et al. "ARB: A Hardware Mechanism for Dynamic Reordering of Memory References," pp. 1-28.

Marcelo Cintra et al., "Architectural Support for Scalable Speculative Parallelization in Shared-Memory Multiprocessors," Intl. Symp. on Computer Architecture (ISCA), Jun. 2000, pp. 13-24.

J. Gregory Steffan et al., "A Scalable Approach to Thread-Level Speculation," pp. 1-12.

Pedro Marcuello et al., "Clustered Speculative Multithreaded Processors," pp. 1-23.

Lance Hammond et al., "Data Speculation Support for a Chip Multiprocessor," pp. 1-12.

Jeffrey Oplinger et al., "In Search of Speculative Thread-Level Parallelism," Stanford University, pp. 1-41.

Sridhar Gopal et al., "Speculative Versioning Cache," to appear in the Fourth International Symposium on High-Performance Computer Architecture, pp. 1-11.

Manish Gupta et al., "Techniques for Speculative Run-Time Parallelization of Loops," pp. 1-12.

V. Krishnan et al., "The Need for Fast Communication in Hardware-Based Speculative Chipmultprocessors," Parallel Architectures and Compilation Techniques, 1999 Proceedings, 1999 International Conference on, Abstract.

Jenn-Yuan Tsai et al., "The Superthreaded Processor Architecture," pp. 0-40.

Ye Zhang et al., "DSM Hardware for Speculative Parallelization." pp. 1-5.

Maldonado et al., "Scheduling Support for Transactional Memory Contention Management," Jan. 2010, ACM, pp. 1-11.

Rajwar et al., "Transactional Lock-Free Execution of Lock-Based Programs," Oct. 2002, ACM, pp. 1-17.

U.S. Appl. No. 12/711,328, entitled "Thread Speculation Execution and Asynchronous Conflict Events," filed Feb. 24, 2010, by Thomas M. Gooding, et al.

| | | CONFLICT REGISTER | | | 148 |
|---|---|---|---|---|---|
| SPEC THREAD ID (330) | 1-CONFLICT (335) | MORE-THAN-1-CONFLICT (340) | CONFLICT-WITH-NON-SPECULATIVE (345) | ENEMY THREAD ID (350) | |
| THREAD A | TRUE | FALSE | FALSE | THREAD B | 305 |
| THREAD B | FALSE | TRUE | FALSE | THREAD C | 310 |
| THREAD C | TRUE | FALSE | FALSE | THREAD D | 315 |
| THREAD D | TRUE | FALSE | FALSE | THREAD B | 320 |
| THREAD E | TRUE | FALSE | TRUE | THREAD G | 325 |
| THREAD F | FALSE | FALSE | FALSE | | 328 |

FIG. 3

SPECULATIVE THREAD EXECUTION WITH HARDWARE TRANSACTIONAL MEMORY

CROSS REFERENCE TO RELATED APPLICATION

This is a continuation application of U.S. patent application Ser. No. 12/711,352, filed Feb. 24, 2010, to Mark E. Giampapa, et al., entitled "SPECULATIVE THREAD EXECUTION WITH HARDWARE TRANSACTIONAL MEMORY," which is herein incorporated by reference.

FIELD

An embodiment of the invention generally relates to hardware transactional memory, and more particularly to thread-level speculative processor execution that uses hardware transactional memory.

BACKGROUND

Computer systems typically comprise a combination of hardware, such as semiconductors, transistors, chips, and circuit boards, and computer programs. As increasing numbers of smaller and faster transistors can be integrated on a single chip, new processors are designed to use these transistors effectively to increase performance. The arising challenge is to find the most effective way to put these transistors to use. Currently, many computer designers opt to use the increasing transistor budget to build ever bigger and more complex uni-processors. Alternatively, multiple processor cores can be placed on a single chip.

Placing multiple smaller processor cores on a single chip is attractive because a single, simple processor core is less complex to design and verify. This results in a less costly and complex verification process, as a once verified module, the processor, is repeated multiple times on a chip. A way to take advantage of the multi-processors is to partition sequential computer programs into threads and execute them concurrently and speculatively, on the multiple processors. Thus, a speculative multi-threaded processor consists logically of replicated processor cores that cooperatively perform the parallel execution of a sequential program.

Computer programs often use data structures that must be shared among the multiple threads, resulting in frequent concurrent reads of and writes to the shared data structures. A hardware transactional memory system provides a model for constructing multi-threaded programs that need to control access to shared data structures. These systems allow computer programs executing in one thread to optimistically assume that shared data structures can be updated without conflict with the accesses and updates of other threads of execution. The speculative updates to memory are kept pending until the transactional memory system confirms that no conflicts with storage accesses of other threads have occurred. The hardware transactional memory system discards the pending speculative updates when conflicts between the storage accesses of multiple threads are detected.

SUMMARY

A computer-readable storage medium and computer system are provided. In an embodiment, if a self thread has more than one conflict, a transaction of the self thread is aborted and restarted. If the self thread has only one conflict and an enemy thread of the self thread has more than one conflict, the transaction of the self thread is committed. If the self thread only conflicts with the enemy thread, the enemy thread only conflicts with the self thread, and the self thread has a key that has a higher priority than a key of the enemy thread, the transaction of the self thread is committed. If the self thread only conflicts with the enemy thread, the enemy thread only conflicts with the self thread, and the self thread has a key that has a lower priority than the key of the enemy thread, the transaction of the self thread is aborted. If the self thread has only one conflict, the enemy thread of the self thread has only one conflict, and the self thread does not conflict with the enemy thread, the transaction of the self thread is aborted. If new conflicts occur during the process of committing that cause the commit to fail, the above algorithm is repeated until commit succeeds. In an embodiment, each thread makes its own decisions of whether to abort or commit a transaction, independent of the abort/commit decisions of other threads.

BRIEF DESCRIPTION OF THE SEVERAL VIEWS OF THE DRAWINGS

Various embodiments of the present invention are hereinafter described in conjunction with the appended drawings:

FIG. 3 depicts a block diagram of an example data structure for a conflict register, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
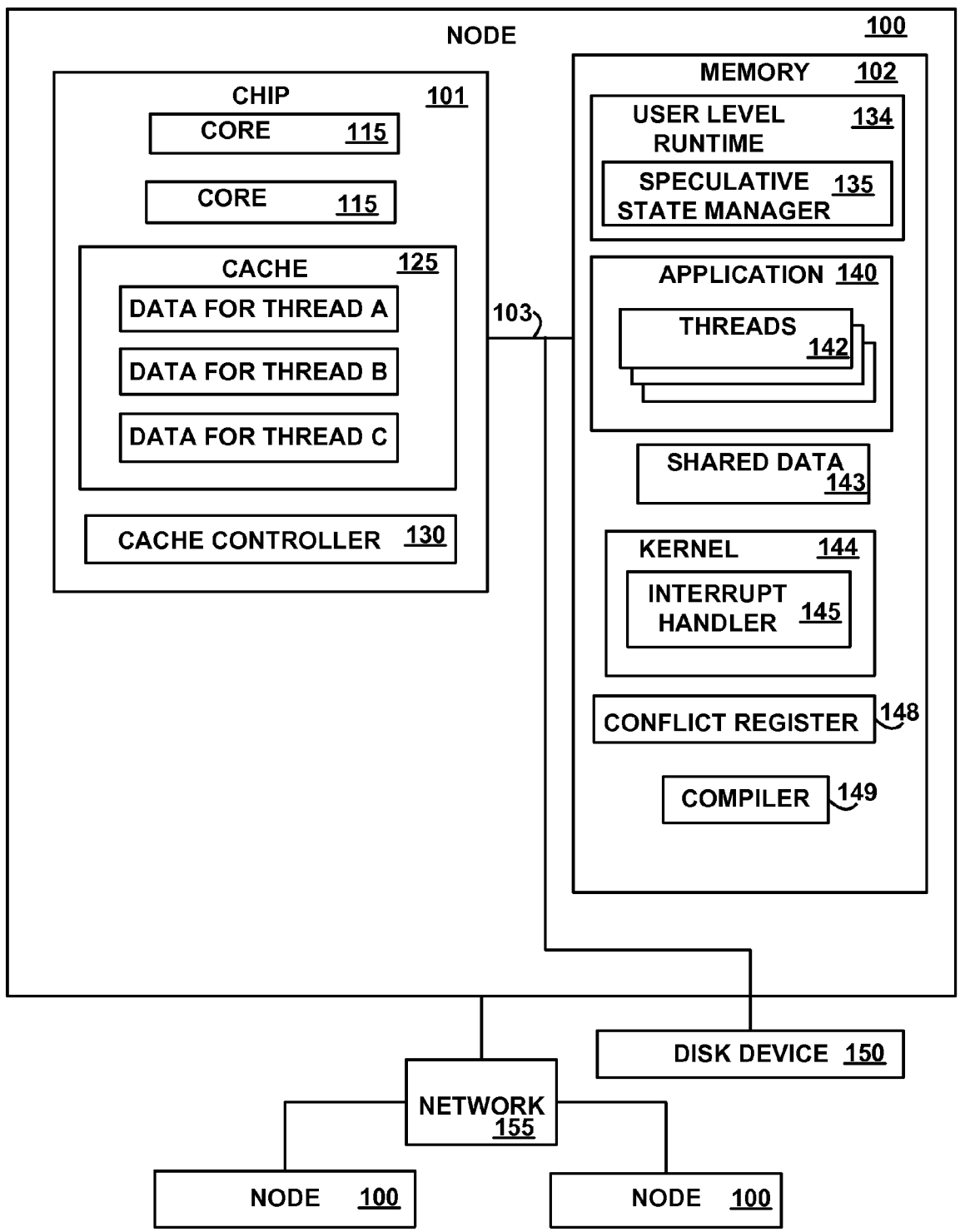
FIG. 1 depicts a high-level block diagram of an example system for implementing an embodiment of the invention.

Referring to the Drawings, wherein like numbers denote like parts throughout the several views, FIG. 1 depicts a high-level block diagram representation of node computer systems 100 connected via a network 155. In an embodiment, one or more of the node computer systems 100 are also connected to disk devices 150 or other secondary storage.

The major components of the nodes 100 comprise a chip 101, and a main memory 102, which are communicatively coupled, directly or indirectly, for inter-component communication via a bus 103. Although FIG. 1 only illustrates one chip 101, in other embodiments any number of chips may be present.

The chip 101 comprises any number of cores 115, a shared cache 125, and a cache controller 130. Each core 115 comprises a processor that is a general-purpose programmable central processing unit (CPUs) and may also include cache. Each processor executes instructions stored in the main memory 102.

The cache controller 130 controls access to the shared cache 125 and detects conflicts between threads. The cache 125 stores data that speculatively-executed threads access (read and/or write) prior to the data being committed and written to the memory 102. The cache 125 also stores data that non speculative threads access. In response to threads requesting an access (read or write) of data from or to the memory 102, the core adds the read or written data into the cache 125 until the transaction is committed. A thread is able to read its own data from the cache 125, but is not allowed to read the data from the cache 125 that has been written to the cache 125 by other threads. In various embodiments the cache 125 may be a L2 (Level 2) cache, but in other embodiments any appropriate level or type of cache may be used.

A processor cache is memory used by a processor to reduce the average time needed to access data. Caches are typically smaller and faster than the main memory 102 and store copies of the data from main memory locations. In a multi-level cache system, a processor has multiple caches, with small fast caches backed up by larger slower caches. When the processor needs to read from or write to a location in the main memory 102, the processor first checks whether a copy of that data is in the L1 (Level 1) cache. If so, the processor reads from or writes to the L1 cache, which is faster than reading from or writing to the main memory. If the desired data is not present in the L1 cache, the processor checks the next larger cache (the L2 cache) for the data, and so on, until no more caches exist, which causes the processor to access the main memory 102 for the data.

The main memory 102 is a random-access semiconductor memory, storage device, or storage medium for storing or encoding data and programs. The main memory 102 is conceptually a single monolithic entity, but in other embodiments the main memory 102 is a more complex arrangement, such as a hierarchy of caches and/or other memory devices. For example, the memory 102 may exist in multiple levels of memory devices of varying sizes and speeds. The memory 102 is shared by the cores 115 in the chip 101.

The main memory 102 stores or encodes a user level runtime 134, an application 140, shared data 143, an operating system kernel 144, conflict register 148, and a compiler 149. Although the user level runtime 134, the application 140, the shared data 143, the kernel 144, the conflict register 148, and the compiler 149 are illustrated as being contained within the memory 102 in the node computer system 100, in other embodiments some or all of them may be on different computer system nodes and may be accessed remotely, e.g., via the network 155. The computer system node 100 may use virtual addressing mechanisms that allow the programs of the computer system 100 to behave as if they only have access to a large, single storage entity instead of access to multiple, smaller storage entities. Thus, while the user level runtime 134, the application 140, the shared data 143, the kernel 144, the conflict register 148, and the compiler 149 are illustrated as being contained within the main memory 102, these elements are not necessarily all completely contained in the same storage device at the same time. Further, although the user level runtime 134, the application 140, the shared data 143, the kernel 144, the conflict register 148, and the compiler 149 are illustrated as being separate entities, in other embodiments some of them, portions of some of them, or all of them may be packaged together.

The user level runtime 134 comprises a speculative state manager 135. In an embodiment, the user level runtime 134 is a portion of the compiler 149. In various embodiments, the application 140 is a user application, a third-party application, an operating system, or any portion, multiple, or combination thereof. The compiler compiles the application 140, which comprises threads 142, which are different instances of the application 140. All of the threads 142 comprise identical code, instructions, or statements, but the execution of the threads 142 on the processors may take different paths through the code.

In an embodiment, the threads may comprise both transaction code and non-transaction code. The transaction code is delineated within the application by special instructions that mark the beginning and the end of a group of instructions that forms an atomic transaction. During speculative execution of a thread, transaction code is executed atomically by the processor, meaning that the storage locations modified by the transaction are atomically updated in the shared data 143 within the memory 102.

Atomically updating the shared data 143 means that changes to the shared data are kept pending and buffered in the cache 125 until the cache controller 130, the speculative state manager 135, and/or the interrupt handler 145 indicate that the data in the cache 125 that was accessed by the thread is to be committed and written to the shared data 143. All of the updates in the cache 125 made by a particular thread are either committed to the shared data 143 at once or they are discarded, resulting in the transaction being aborted or rolled back. Thus, in an atomic transaction, the execution of multiple operations within the transaction appear to be executed together without any intervening operations, which is also known as the atomicity property of a transaction. For example, if a memory address is accessed within an atomic transaction, the memory address is not modified elsewhere until the atomic transaction completes. Thus, if a thread uses an atomic transaction to access a set of memory addresses, the atomic transaction guarantees that another thread cannot modify any of the memory addresses throughout the execution of the atomic transaction. An atomic transaction is further described below with reference to FIG. 2.

For speculative execution, the speculative state manager 135 instructs the chip 101 whether to commit the data or to discard the data. Thus, the chip 101 detects conflicts between threads that attempt to access the same memory location, and the speculative state manager 135 decides whether to commit or discard the buffered data that was written by the transactions that conflict. The word "buffer," as used herein, means that the speculative writes made to the cache 125 are not automatically updated to the memory 102. This data written by these speculative writes is kept in the cache 125, until the speculative state manager 135 instructs the chip 101 whether to commit the contents of the cache 125 to the memory 102 or discard the data.

A transaction may be retried non-speculatively, such as in the example cases of buffer overflow conditions, irrevocable operations conditions, or in response to a number of retries of the transaction exceeding a threshold. Prior to non-speculative execution, a thread obtains a lock on the data in the cache 125 to ensure that it is the only thread executing non-speculatively. Since non-speculative writes to the cache 125 are automatically copied to and synchronized with the memory 102 using a cache replacement policy, writes by a non-speculative thread are always committed, which breaks the atomicity property of a transaction.

Non-transaction code also performs non-speculative reads/writes from/to the cache 125. For these non-speculative writes, the cache replacement policy of the chip 101 always commits the writes by copying the data from the cache 125 to the shared data 143 in the memory 102.

In various embodiments, all of the threads 142 are speculatively-executed on the processors or some of the threads 142 are non-speculatively executed while other of the threads 142 are speculatively executed. Non-speculative execution of a thread means that all of the code within the thread, whether transaction code or non-transaction code is executed non-speculatively by the processor.

In various embodiments, the shared data 143 is implemented as a file, an object, a database, a data structure, an array, a document, a folder, a library, a directory, a sub-directory, or any combination, multiple, or hierarchy thereof. The shared data 143 is accessed (read from and written to) by multiple of the threads 142 when executed by the processors.

In an embodiment, the conflict register 148 is implemented as memory mapped I/O (Input/Output). The chip 101, the processors of the cores 115, and/or the cache controller 130 write/read or send/receive data values to/from the conflict register 148 as the threads execute, in order to represent the status of various conflicts that may occur between different threads as the different threads access the same storage locations. The speculative state manager 135 and/or the interrupt handler 145 read the conflict status of threads from the conflict register 148 and use the conflict status, in order to determine the action needed to resolve conflicts between threads and to determine whether to abort and restart transactions or commit the cached data for the threads to the shared data 143.

The kernel 144 comprises an operating system or a portion of an operating system. The kernel 144 comprises an interrupt handler 145, which receives and responds to interrupts generated by the processors.

In an embodiment, the cache controller 130, the speculative state manager 135, the threads 142, and/or the interrupt handler 145 comprise instructions or statements that execute on the processors or instructions or statements that are interpreted by instructions or statements that execute on the processors, to carry out the functions as further described below with reference to FIGS. 4, 5, 6, 7, and 8. In another embodiment, the cache controller 130, the speculative state manager 135, the threads 142, and/or the interrupt handler 145 are implemented in hardware via semiconductor devices, chips, logical gates, circuits, circuit cards, and/or other physical hardware devices.

In various embodiments, the disk devices 150 are implemented as disk drives, direct access storage devices, rotating magnetic disk drive storage devices, arrays of disk drives configured to appear as a single large storage device to a host computer, or any type of secondary storage device. The contents of the main memory 102, or any portion thereof, may be stored to and retrieved from the disk devices 150, as needed.

Although the bus 103 is shown in FIG. 1 as a relatively simple, single bus structure providing a direct communication path among the chip 101, the main memory 102, and the disk device 150, in fact the bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, bus 103 may comprise a memory bus, an I/O bus, I/O bus interface units, I/O processors, or any multiple and/or combination thereof.

In various embodiments, the node computer systems 100 are multi-user mainframe computer systems, single-user systems, or server computers or similar devices that have little or no direct user interface, but receive requests from other computer systems (clients). In other embodiments, the node computer systems 100 are implemented as desktop computers, portable computers, laptop or notebook computers, tablet computers, pocket computers, telephones, smart phones, pagers, automobiles, teleconferencing systems, appliances, or any other appropriate type of electronic devices.

In an embodiment, the nodes 100 are logically arranged in a three-dimensional lattice, each node having a respective x, y and z coordinate. Each node 100 in the lattice contains a set of node-to-node communication links for communicating data with its immediate neighbors in the x, y and z coordinate dimensions. As used herein, the term "lattice" includes any regular pattern of nodes 100 and inter-nodal data communications paths in more than one dimension, such that each node 100 has a respective defined set of neighbors, and such that, for any given node, it is possible to algorithmically determine the set of neighbors of the given node from the known lattice structure and the location of the given node in the lattice. A "neighbor" of a given node 100 is any node 100 which is linked to the given node 100 by a direct inter-nodal data communications path, i.e. a path which does not have to traverse another node. The lattice structure is a logical one, based on inter-nodal communications paths. It is not necessarily true that a given node's neighbors are physically the closest nodes 100 to the given node 100, although it is generally desirable to arrange the nodes 100 in such a manner, insofar as possible, as to provide physical proximity of neighbors.

In one embodiment, the node lattice logically wraps to form a 3D (three dimensional) torus in all three coordinate directions, and thus has no boundary nodes. For example, if the node lattice contains $dim_x$ nodes in the x-coordinate dimension ranging from 0 to ($dim_x-1$), then the neighbors of Node(($dim_x-1$), y0, z0) include Node(($dim_x-2$), y0, z0) and Node (0, y0, z0), and similarly for the y-coordinate and z-coordinate dimensions. In other embodiments, a logical torus without boundary nodes is not necessarily a requirement of a lattice structure.

This aggregation of node-to-node communication links is referred to herein as the torus network. The torus network permits each node 100 to communicate results of data processing tasks to neighboring nodes for further processing in certain applications which successively process data in different nodes 100. But, the torus network contains only a limited number of links, and data flow is optimally supported when running generally parallel to the x, y or z coordinate dimensions, and when running to successive neighboring nodes. For this reason, applications requiring the use of a large number of nodes may subdivide computation tasks into blocks of logically adjacent nodes (communicator sets) in a manner to support a logical data flow, where the nodes 100 within any block may execute a common application code function or sequence.

The network 155 may be any suitable network or combination of networks and may support any appropriate protocol suitable for communication of data and/or code to/from the nodes 100. In an embodiment, the network 155 may be implemented via an Ethernet network, but in other embodiments any appropriate network or combination of networks implementing any appropriate protocol may be used. In another embodiment, the network 155 may represent a storage device or a combination of storage devices, either connected directly or indirectly to the nodes 100.

Although only the network 155 is illustrated, in other embodiments additional networks may be present, such as the 3D torus network described above for point-to-point communication between the nodes 100 and a global barrier and interrupt network. Further the nodes 100 may be of any appropriate type and a variety of types, such as a compute node, a service node, an I/O (Input/Output) node, and some of the nodes may be connected via different networks.

It should be understood that FIG. 1 is intended to depict the representative major components of the nodes 100, the network 155, and the disk device 150 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100, and that, when read and executed by one or more processors in the computer system 100 or when interpreted by instructions that are executed by one or more processors, cause the computer system 100 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc that are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the disk device 150), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one ore more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
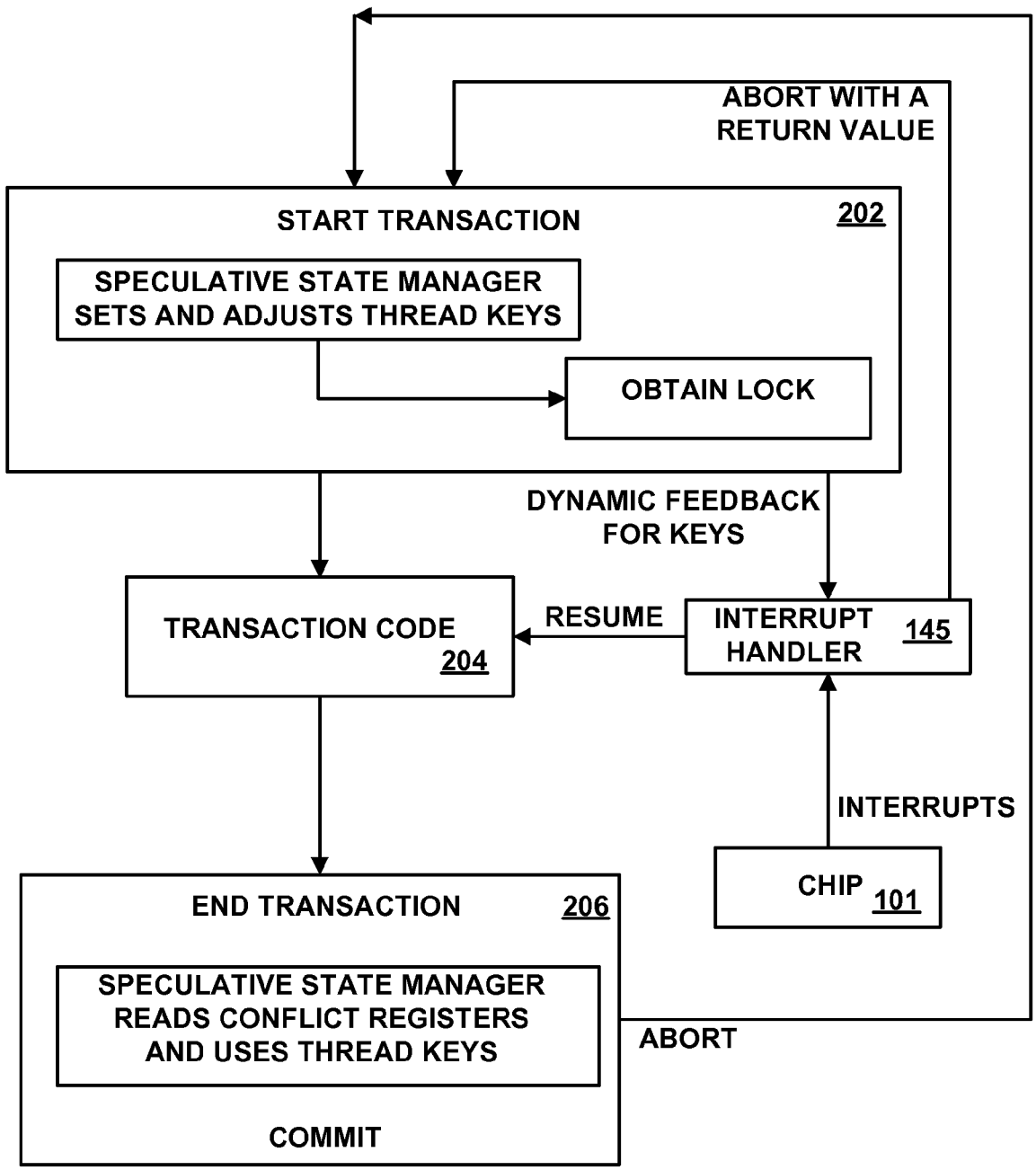
FIG. 2 depicts a block diagram illustrating the interaction of selected components during execution of a transaction, according to an embodiment of the invention.

FIG. 2 depicts a block diagram illustrating the interaction of selected components during execution of a transaction, according to an embodiment of the invention.

The speculative state manager 135 sets a priority key for each thread and sends the priority key value to the interrupt handler 145. The transaction code 204, which is a portion of the threads 142 (FIG. 1), executes on the processor and performs a transaction. In response to detecting speculative state violations during execution of the transaction code, in an embodiment the chip 101 sets values in the conflict register 148 and/or triggers different types of interrupts, which are received by the interrupt handler 145. The types of speculative state violations include conflicts between threads that access the same storage location, an overflow of the cache 125, and irrevocable actions initiated by the threads 142.

The chip 101 sends, to the interrupt handler 145, the type of interrupt (conflict interrupt, cache overflow interrupt, or irrevocable action interrupt) and an identification of the thread that was executing and encountered or caused the speculative state violation. An overflow of the cache 125 is caused by the amount of data that the thread writes to the cache 125 exceeding the storage size or capacity of the cache 125. Irrevocable actions are actions or operations initiated by the transaction code 204 that cannot be rolled back or undone and include I/O operations that the transaction code 204 initiates to the network 155 or the disk device 150.

In an embodiment, the interrupt handler 145 decides whether to commit or abort a transaction based on the priority key for the thread that encountered the speculative state violation and based on the different types of the interrupts caused by the different speculative state violations, which is further described below with reference to FIGS. 5 and 6.

If the interrupt handler 145 decides to abort a transaction, the interrupt handler 145 sends a return code to the speculative state manager 135. Based on the return code, the speculative state manager 135 determines whether to retry the transaction speculatively or re-execute the thread non-speculatively using a lock on the storage location accessed by the transaction.

In another embodiment, the conflict interrupts are disabled (irrevocable action and cache overflow interrupts are still enabled), so in response to the execution of the thread reaching the end of the transaction code 204, the speculative state manager 135 commits or aborts and retries the transaction based on information read from the conflict register 148, as further described below with reference to FIGS. 7 and 8.

The priority key signifies the importance of a particular transaction. In an embodiment, keys are implemented via a global array that includes elements, where each element corresponds to the key of a particular thread. The speculative state manager 135 passes the address of the global array to the interrupt handler 145 via a system call. The higher the key of a thread, the more important the transaction that the thread executes. In an embodiment, the key is a function of the timestamp indicating the time that transaction code began executing, and the speculative state manager 135 assigns a higher value key to an older transaction and a lower value key to a younger or more recent transaction.

When conflicts arise between transactions, the progress decision is made in favor of the transaction with a higher value key. Further, the speculative state manager 135 adjusts the key dynamically, such that when a transaction has been aborted several times (more than a threshold number of times), the speculative state manager 135 increases the value of the key. This favors progress in the next attempt of the transaction. Furthermore, if the priority of the key exceeds a threshold value, then the thread that contains the transaction executes non-speculatively, which ultimately guarantees progress. In the case where more than one thread wishes to execute non-speculatively, a lock is acquired first by the thread on the data that the thread accesses. Locking ensures that only one thread executes the transaction non-speculatively at a time.

FIG. 3 depicts a block diagram of an example data structure for a conflict register 148, according to an embodiment of the invention. The conflict register 148 represents conflicts that have occurred between threads. In response to detecting conflicts between threads as the threads execute on the processors, the chip 101 sets values into the conflict register 148. The following are examples of the detected conflicts that can occur between speculatively executed threads and between a speculatively executed thread and a non-speculatively executed thread:

a read from a storage location performed by transaction code in one thread followed (later in time) by a write to the same storage location (having the same address within the memory 102) that is performed by transaction code in a different thread;

a write to a storage location performed by transaction code in one thread followed (later in time) by write to the same storage location (having the same address within the memory 102) that is performed by transaction code in a different thread; and a write to a storage location performed by transaction code in one thread followed (later in time) by a read to the same storage location (having the same address within the memory 102) that is performed by transaction code in a different thread.

The storage locations described in the aforementioned detected conflicts are locations within the memory 102 that the execution of the threads has requested to access, even though the read or write may have been performed from or to the cache 125 since conflicts are detected prior to committing the data to the memory 102.

The conflict register 148 comprises any number of rows, records, or entries 305, 310, 315, 320, 325, and 328, each of which is comprised of columns or fields, which are a speculative thread identifier field 330, a 1-conflict field 335, a more-than-1-conflict field 340, a conflict-with-non-speculative field 345, an enemy thread identifier field 350, and potentially other fields. The conflict register 148 is set by the chip 101 in response to detecting conflicts between threads executing on the processors.

The speculative thread identifier field 330 identifies or specifies one of the threads 142 that is speculatively executed by the processor. Each of the records 305, 310, 315, 320, and 325 represents conflicts for a different thread identified in its respective speculative thread identifier field 330 in the same record.

The 1-conflict field 335 indicates whether or not the thread identified by the speculative thread identifier field 330, in the same record, has encountered one and only one conflict with another thread. If only one conflict has been encountered by the thread 330, then the 1-conflict field 335 is set to a value that indicates true. If no conflicts or more than one conflict have been encountered by the thread 330, then the 1-conflict field 335 is set to a value that indicates false.

If only one conflict has been encountered by the thread 330, then the more-than-1 conflict field 340 in the same record is set to a value that indicates false. If more than one conflict has been encountered by the thread 330, then the more-than-1-conflict field 340 in the same record is set to a value that indicates true.

The conflict-with-non-speculative field 345 indicates whether or not the thread identified by the speculative thread identifier field 330 in the same record has encountered a conflict with a non-speculatively executed thread. If the thread 330 has encountered a conflict with a non-speculatively executed thread, then the conflict-with-non-speculative field 345 in the same record is set to indicate true. If the thread 330 has not encountered a conflict with a non-speculatively executed thread, then the conflict-with-non-speculative field 345 in the same record is set to indicate false.

The enemy thread identifier field 350 identifies a thread that conflicts with the thread 330, in the same record. If a conflict with one speculatively-executed thread (the a 1-conflict field 335 indicates true) has been encountered, then the enemy thread identifier field 350, in the same record, identifies the enemy thread with which the thread 330 conflicts. If a conflict with more than one speculatively-executed thread has been encountered (the more-than-1-conflict field 340 indicates true), then the enemy thread identifier field 350, in the same record, identifies the first enemy thread (the earliest enemy that was encountered) with which the thread 330 conflicts. If a conflict with a non-speculatively executed thread (specified by the conflict-with-non-speculative field 345 set to indicate true) has been encountered, then the enemy thread identifier field 350, in the same record does not identify the enemy thread with which the thread 330 conflicts because non-speculatively executed threads do not have speculative thread identifiers, in an embodiment.

If no conflicts with a thread have been encountered (e.g., as illustrated in record 328), then the 1-conflict field 335, the more-than-1-conflict field 340, and the conflict-with-non-speculative field 345 indicate false and the enemy thread identifier 350 does not specify a valid thread identifier.

Figure 4:
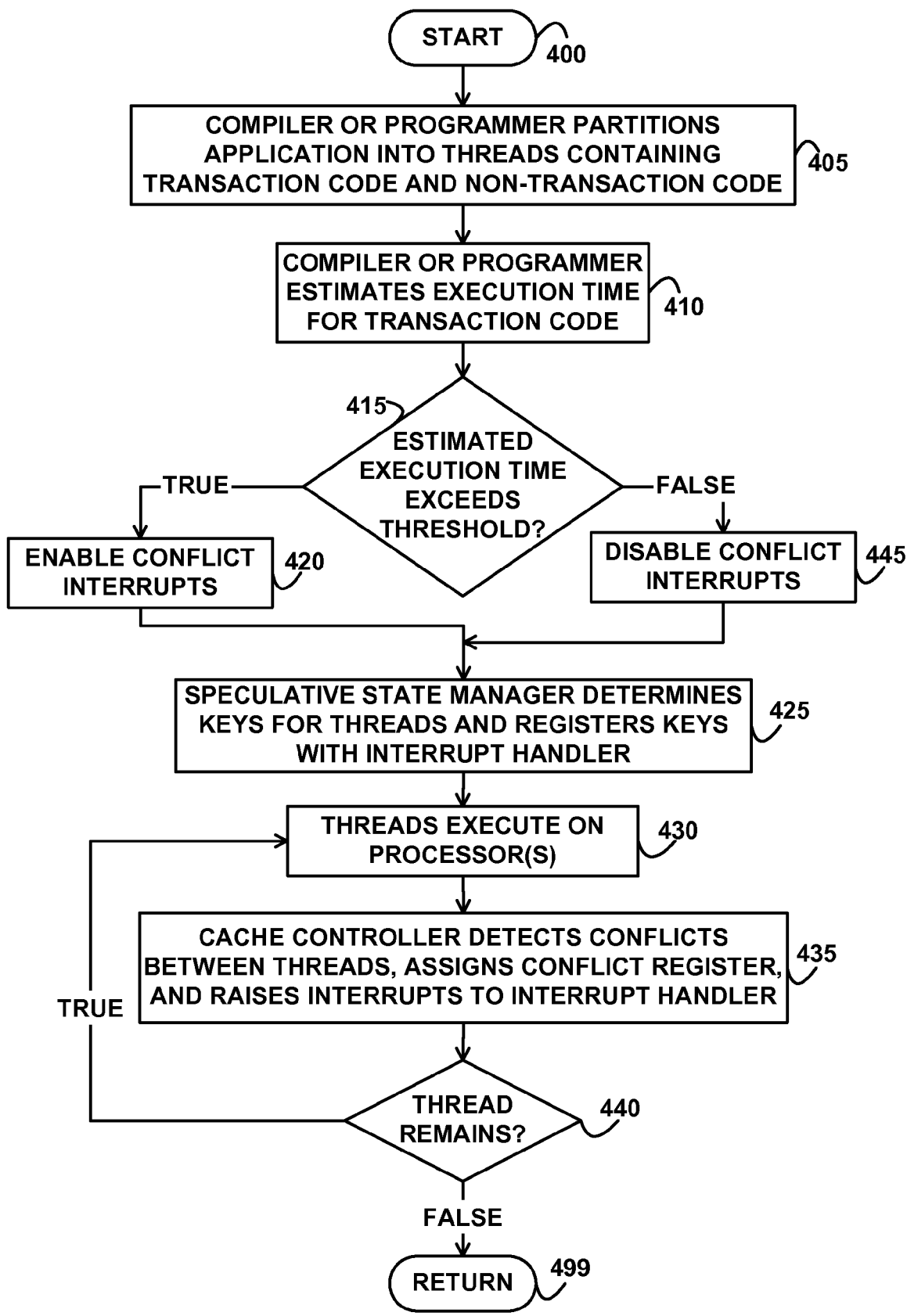
FIG. 4 depicts a flowchart of example processing for executing threads, according to an embodiment of the invention.

FIG. 4 depicts a flowchart of example processing for executing threads, according to an embodiment of the invention. Control begins at block 400. Control then continues to block 405 where the compiler 149 or programmer partitions the application 140 into threads 142 and transaction code regions. The compiler 149 or programmer designates each thread as a speculative thread or a non-speculative thread. Each thread includes zero, one, or more transaction code regions. In various embodiments, thread comprises transaction code, non-transaction code, or any multiple or combination thereof.

Control then continues to block 410 where the compiler 149 or programmer estimates the execution time for the transaction code regions in the threads. In various embodiments, the execution time is based on the historical experience of executing the transaction code, the number of instructions within the transaction code (e.g., more instructions are estimated to use more time than fewer instructions), and the type of instructions within the transaction code (e.g., instructions within transactions that perform function calls, context switches, and I/O operations to secondary storage may take more time than arithmetic operations on the content of registers).

Control then continues to block 415 where the speculative state manager 135 determines (either statically or dynamically using profile directed feedback) whether the median or mean estimated execution time of a transaction or of a selected set of the transactions exceeds a threshold value. In an embodiment, the threshold value is the estimated time for a conflict interrupt raised by the chip 101 to reach the interrupt handler 145. In various embodiments, the estimated time for the conflict interrupt to reach the interrupt is determined from profile directed feedback, from experimental measurements, or from the design specification of the node 100. If the determination at block 415 is true, then the median or mean estimated execution time of a transaction or of a selected set of the transactions exceeds a threshold value, so control continues to block 420 where the speculative state manager 135 requests the cache controller 130 to enable conflict interrupts. In response to the request, the cache controller 130 enables conflict interrupts, which allows the chip 101 to raise conflict interrupts. Since conflict interrupts are raised, the interrupt handler logic illustrated in FIG. 5 handles conflict interrupts if the interrupt handler receives the conflict interrupts prior to the speculative state manager being invoked at the end of the transaction code 206.

Referring again to FIG. 4, control then continues to block 425 where the speculative state manager 135 determines keys for the threads and registers the keys with the interrupt handler 145. In an embodiment, the speculative state manager 135 initializes the keys for all threads to be identical. In another embodiment, the speculative state manager 135 initializes the keys to reflect the priorities of different types of requests processed by the threads, to reflect the priorities of different categories of users that initiate the requests, or to give higher priority to threads that are created earlier (older threads), or to give higher priority to threads that obtain a thread identifier earlier (older speculatively-executed transactions).

Control then continues to block 430 where the threads execute on the processors for a time period. In various embodiments, the time period of execution for each thread and each processor may be different or the same and may depend on the number and type of conflicts and interrupts that various threads encounter and the control flow path that execution of the thread takes through its code. In an embodiment, the processors each execute only one thread at a time, and each processor executes a different thread. In an embodiment, all of the threads that execute during the time period contain identical code, although the execution of the threads may take different paths through the code during the time period, so that some or all of the threads execute different transactions.

Control then continues to block 435 where the cache controller 130 detects conflicts between threads, assign values to the conflict register 148 for the threads, and raises (or sends) conflict interrupts which are handled by the interrupt handler 145. For conflicts between two threads (if conflict interrupts are enabled), the cache controller 130 raises two interrupts, one for each of the threads in conflict. As another example, if thread A and thread B both read shared data X, and thread C writes to the shared data X, then thread A and thread C are in conflict at the same time that thread B and thread C are in conflict, so the cache controller 130 raises two interrupts to thread C (because thread C conflicts with two threads) while the cache controller 130 raises one interrupt each for thread A and thread B.

The handling of an interrupt causes the execution of each thread for which the interrupt was raised to stop executing at its current instruction, and then each thread begins executing an instance of the interrupt handler 145. Example logic for the interrupt handler 145, which handles multiple interrupts from the chip 101, which supports multiple speculative threads, is further described below with reference to FIG. 5.

In an embodiment, the chip 101 raises interrupts of a variety of types, including a conflict interrupt (if conflict interrupts are enabled), a cache overflow interrupt, and an irrevocable action interrupt. If conflict interrupts are disabled, the chip 101 does not raise conflict interrupts, but still raises the cache overflow interrupt and the irrevocable action interrupt.

Referring again to FIG. 4, control then continues to block 440 where the processors in the cores 115 determine whether any thread remains to execute. That is, the processors determine whether at least one thread exists that comprises an instruction that remains to be executed and the thread is not halted. If the determination at block 440 is true, then a thread remains to execute, so control returns to blocks 430 and then 435 where the processors continue to execute any threads that remain to be executed and are not halted and continue to detect conflicts and raise interrupts, as previously described above. The term halted, as used herein, means that a thread is put to sleep by the operating system and may be awakened later to continue execution of the application when a core 115 is available.

If the determination at block 440 is false, then the execution of all threads is complete, so control continues to block 499 where the logic of FIG. 4 returns.

If the determination at block 415 is false, then the estimated execution time does not exceed the threshold, so control continues to block 445 where the speculative state manager 135 requests the cache controller 130 to disable conflict interrupts. In response to the request, the cache controller 130 disables conflict interrupts, which prevents conflict interrupts from being raised. Since conflict interrupts are not raised, the interrupt handler logic illustrated in FIG. 5 and the speculative state manager logic of FIG. 6 do not handle conflict interrupts (although the interrupt handler illustrated in FIG. 5 does still handle irrevocable action and cache overflow interrupts). Instead, the speculative state manager logic illustrated in FIGS. 7 and 8 is invoked at the end of the transaction 206. Referring again to FIG. 4, control then continues to block 425, as previously described above.

Figure 5:
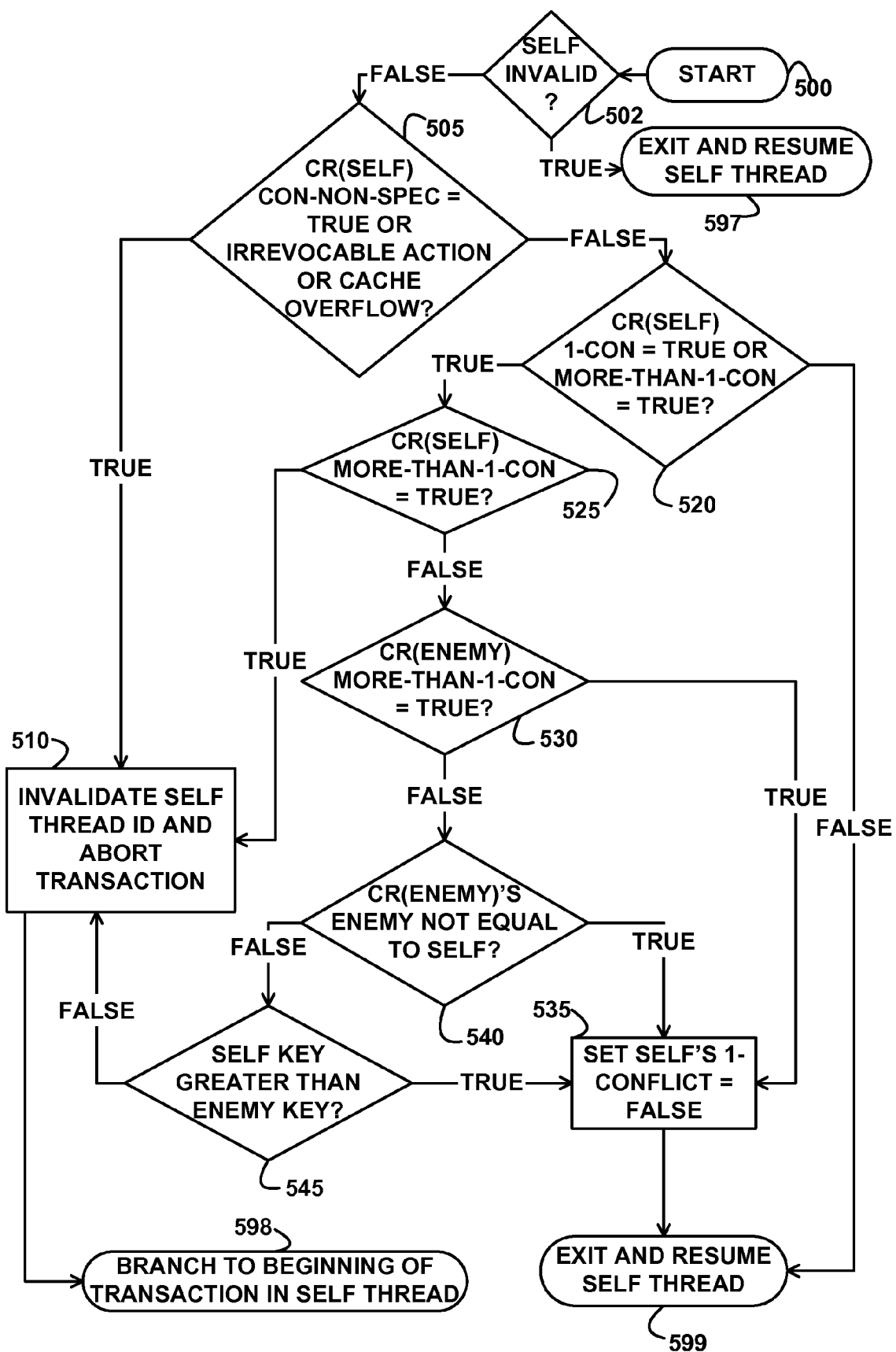
FIG. 5 depicts a flowchart of example processing for an interrupt handler responding to conflicts, according to an embodiment of the invention.

FIG. 5 depicts a flowchart of example processing for an instance of the interrupt handler responding to interrupts, according to an embodiment of the invention. In response to the interrupt handler 145 receiving an interrupt from a processor that identifies a self thread and identifies a type of the interrupt, control begins at block 500.

Since the cache controller 130 raises a separate interrupt for each thread that conflicts, the logic of FIG. 5 is invoked multiple times for conflict interrupts, once for each thread, with a self thread identifier specifying one of the conflicting threads in one invocation of the interrupt handler 145, and a self thread identifier specifying the other of the conflicting threads in the other invocation of the interrupt hander. Further, the logic of FIG. 5 is reentrant, meaning that multiple instances of the logic of FIG. 5 may execute concurrently for threads that have conflicts. The interrupt handler 145 arrives at a consistent decision as to which thread to abort and which thread to commit, despite each thread executing the interrupt handler logic If multiple interrupts are raised for the same self thread, the interrupt handler processes them sequentially, in the order they are received. Further, as the interrupt handler 145 processes interrupts, new conflicts can occur and are detected by the cache controller 130. These new conflicts may cause a transaction to not be capable of being committed, which can cause the algorithm of FIGS. 5 and 6 to be repeated until the commit can succeed, as further described below.

Control then continues to block 502 where the interrupt handler 145 determines whether the speculative thread identifier of the self thread is invalid. If the determination at block 502 is true, then the speculative thread identifier of the self thread is invalid, the transaction of the self thread was previously aborted, and the speculative thread identifier of the self thread was invalidated by a previous invocation of the interrupt handler 145 for the self thread, so control continues to block 597 where the interrupt handler resumes execution of the self thread and exits. The self thread resumes executing, starting from the instruction at which the interrupt was raised, as illustrated by the resume arrow from the interrupt handler 145 to the transaction code 204 in FIG. 2.

Referring again to FIG. 5, if the determination at block 502 is false, then the speculative thread identifier of the self thread is valid and the transaction of the self thread was not previously aborted, so control continues to block 505 where the interrupt handler 145 determines whether the self thread conflicts with a non-speculatively executed thread or whether the raised interrupt is a cache overflow interrupt or whether the raised interrupt is an irrevocable action interrupt. That is, the interrupt handler 145 determines whether the conflict register 148 contains a record with a speculative thread identifier 330 that matches (is identical to) the self thread and the same record contains a conflict-with-non-speculative field 345 that indicates true, or the raised interrupt has an interrupt type that indicates that the raised interrupt is the result of a cache overflow condition caused by a transaction executing in the self thread, or the raised interrupt has an interrupt type that indicates that the raised interrupt is the result of an irrevocable action condition caused by a transaction executing in the self thread that initiated an action that cannot be revoked, rolled back, or undone.

If the determination at block 505 is true, then the self thread conflicts with a non-speculatively executed thread, the raised interrupt is a cache overflow interrupt, or the raised interrupt is an irrevocable action interrupt, so control continues to block 510 where the interrupt handler 145 invalidates the thread identifier of the self thread and aborts the transaction that was executing in the self thread at the time when the interrupt was raised, meaning that the data in the cache 125 that was written by the aborted transaction is discarded and is not committed or copied to the shared data 143. If the transaction in the self thread has been aborted (more than a threshold number of times), then the speculative state manager 135 increases the priority of the key of the self thread; otherwise, the speculative state manager 135 does not change the priority of the key of the self thread.

Invalidating the thread identifier of the self thread causes the chip 101 to set the 1-conflict field 335 of the self thread's enemy's conflict register to indicate that no conflict exists. That is, the chip 101 finds a first conflict register record whose speculative thread identifier field 330 matches the self thread and finds a second conflict register record whose speculative thread identifier field 330 matches the enemy thread identifier field 350 of the first conflict register record. The chip 101 then sets the 1-conflict field of the second conflict register record to indicate that no conflict exists.

Control then continues to block 598 where the interrupt handler 145 restarts the self thread at the beginning of the transaction code that was aborted. That is, the interrupt handler 145 sets the instruction pointer of the processor (which indicates the next instruction to execute) that was executing the self thread to point to the address of the instruction at the beginning of the start transaction code 202 (FIG. 2). The speculative state manager 135 executing in the start transaction code 202 of the self thread obtains a new speculative thread identifier, recovers the necessary registers, and then the transaction that was aborted (the transaction code 204 in FIG. 2) is executed again from the beginning.

In an embodiment, if the key of the self thread exceeds a threshold value or if the irrevocable action or cache overflow interrupts were raised, then the interrupt handler 145 changes the self thread to execute non-speculatively, in order to guarantee the progress of the execution of the transaction during the next thread execution. If more than one transaction wishes to concurrently execute non-speculatively, the threads in which the non-speculative transaction execute obtain a lock on the storage locations that the non-speculative transactions all access, in order to ensure that the storage locations are accessed by only one non-speculative thread at a time. If the key of the self thread does not exceed a threshold value and if the irrevocable action and cache overflow interrupts were not raised, the interrupt handler 145 allows the self thread to continue to execute speculatively.

Referring again to FIG. 5, if the determination at block 505 is false, then the self thread does not conflict with a non-speculatively executed thread, the raised interrupt is not a cache overflow interrupt, and the raised interrupt is not an irrevocable action interrupt, so control continues to block 520 where the interrupt handler 145 determines whether the self thread conflicts with only one speculatively-executed thread or whether the self thread conflicts with more than one speculatively-executed thread. That is, the interrupt handler 145 determines whether the conflict register record with a speculative thread identifier 330 that matches the self thread identifier contains a 1-conflict field 335 that indicates true or contains a more-than-1-conflict field 340 that indicates true.

If the determination at block 520 is true, then the self thread conflicts with only one speculatively-executed thread or the self thread conflicts with more than one speculatively-executed thread, so control continues to block 525 where the interrupt handler 145 determines whether the self thread conflicts with more than one speculatively-executed thread. That is, the interrupt handler 145 determines whether the conflict register record with a speculative thread identifier 330 that matches the self thread identifier contains a more-than-1-conflict field 340 that indicates true.

If the determination at block 525 is true, then the self thread conflicts with more than one speculatively-executed thread, so control continues to blocks 510 and 598, where the thread identifier of the self thread is invalidated by the interrupt handler 145. Thus, the transaction is aborted, and the self thread is restarted by the speculative state manager 135, as previously described above. Thus, all transactions in threads that are involved in multiple conflicts are aborted.

If the determination at block 525 is false, then the self thread conflicts with only one speculatively-executed thread, so control continues to block 530 where the interrupt handler 145 determines whether the enemy thread of the self thread conflicts with more than one speculatively-executed thread. That is, the interrupt handler 145 finds the conflict register record with a value in the speculative thread identifier field 330 that matches the self thread, reads the enemy thread identifier value in the enemy thread identifier 350 of the same record, finds the conflict register record with a value in the speculative thread identifier field 330 that matches the selected enemy thread identifier value and determines whether the more-than-1-conflict field 340 of the selected enemy thread conflict register record indicates true.

If the determination at block 530 is true, then the enemy thread of the self thread conflicts with more than one speculatively-executed thread, so control continues to block 535 where the interrupt handler 145 sets the 1-conflict field of the conflict register record with a speculative thread identifier field 330 that matches the self thread identifier to indicate false. The logic of block 535 when executed by the self thread does not alter the conflict register of its enemy thread because when its enemy thread executes the interrupt handler logic of FIG. 5, that enemy thread independently arrives at the decision to abort its own transaction (independent of decisions made by other threads of whether to abort or commit their own transactions). Control then continues to block 599 where the interrupt handler 145 returns to the invoker. That is, the self thread resumes executing, starting from the instruction at which the interrupt was raised, as illustrated by the resume arrow from the interrupt handler 145 to the transaction code 204 in FIG. 2.

Referring again to FIG. 5, if the determination at block 530 is false, then the enemy thread of the self thread does not conflict with more than one speculatively-executed thread, so control continues to block 540 where the interrupt handler 145 determines whether the enemy thread of the self thread's enemy thread is not equal to the self thread. That is, the interrupt handler 145 finds a first conflict register record with a value in the speculative thread identifier field 330 that matches the self thread, reads a first enemy thread identifier value in the enemy thread identifier 350 of the first conflict register record, finds a second conflict register record with a value in the speculative thread identifier field 330 that matches the first enemy thread identifier value and determines whether a second enemy thread identifier value in the enemy thread identifier field 350 of the second conflict register record is not the same as the self thread.

Using the example of FIG. 3, if the self thread is thread C, the enemy thread of thread C is thread D, as illustrated in record 315. But, the enemy of thread D is thread B (as illustrated in record 320) and not thread C, so the determination at block 540 would be true, in this example, because the enemy of the self thread's enemy is not the self thread. This situation can occur as a result of the thread identifier D being reused for another thread after the original enemy of thread C had its transaction aborted, as previously described above with reference to block 510. Thus, in this example, thread C does not conflict with another thread, despite having an enemy thread identifier 350 that indicates thread D.

If the determination at block 540 is true, then the enemy thread of the self thread's enemy is not the self thread, so control continues to block 535 followed by block 599, as previously described above.

If the determination at block 540 is false, then the enemy thread of the self thread's enemy is the self thread, so control continues to block 545 where the interrupt handler 145 determines whether the key of the self thread is larger (indicates a higher priority) than the key of the enemy thread of the self thread.

If the determination at block 545 is true, then the key of the self thread indicates a higher priority than does the key of the enemy thread of the self thread, so control continues to block 535, followed by block 599, as previously described above.

If the determination at block 545 is false, then the self key value is not higher than the enemy key, so control continues to block 510, followed by block 598, as previously described above.

If the determination at block 520 is false, then the self thread does not conflict with only one speculatively-executed thread and the self thread does not conflict with more than one speculatively-executed thread, so control continues to block 599 where the interrupt handler 145 returns to the invoking self thread at the instruction where the interrupt was raised. Stated another way, a false determination at block 520 indicates that the self thread's enemy thread has aborted its transaction, which (during the invocation of the interrupt handler in the enemy thread) causes the self thread's 1-conflict field to be set to indicate that 1-conflict does not exist, as previously described above with reference to block 510 (since the self thread is the enemy of its enemy thread). If the transaction in the self thread has not been aborted (which can occur if a previous invocation of the interrupt handler for a previous interrupt resumes the self thread), the self thread continues executing from the instruction at which the self thread was interrupted at the time that the interrupt was received.

Figure 6:
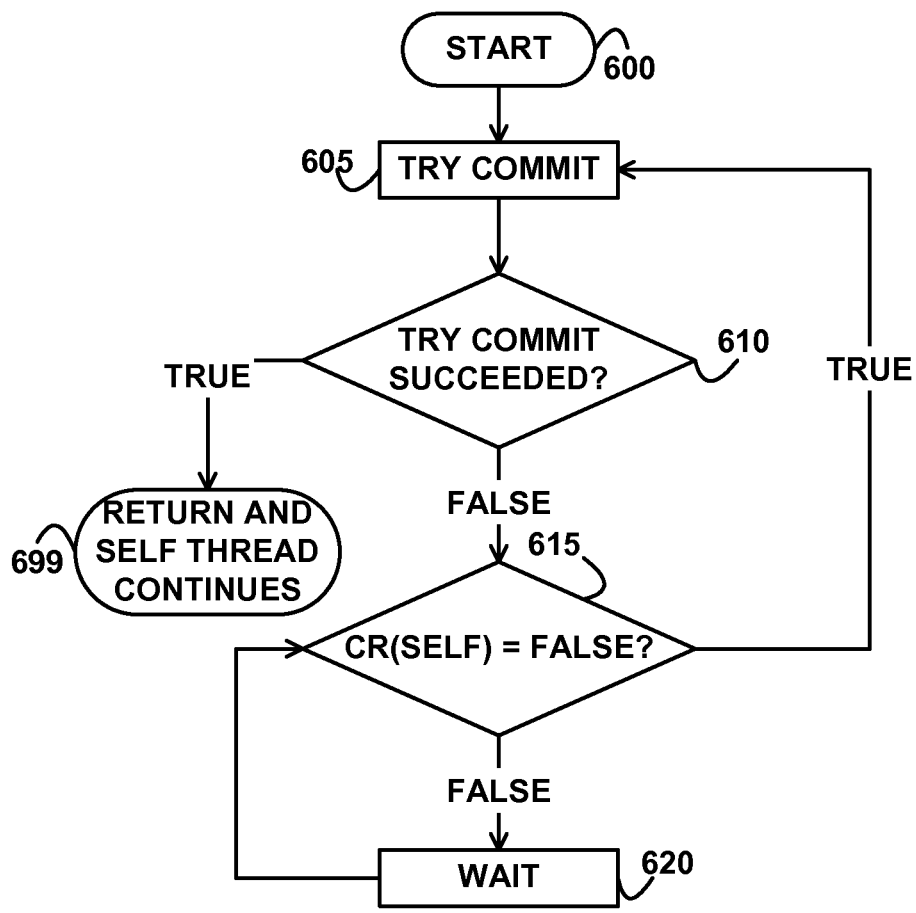
FIG. 6 depicts a flowchart of example processing for a speculative state manager performing a commit operation, according to an embodiment of the invention.

FIG. 6 depicts a flowchart of example processing for a speculative state manager performing a commit operation, according to an embodiment of the invention. The logic of FIG. 6 is reentrant code for every thread 142 (FIG. 1), and an instance of the logic of FIG. 6 is invoked at the end of the transaction 206 (FIG. 2), after the transaction code 204 (FIG. 2) in the respective thread has executed. In an embodiment, the logic of FIG. 6 is a portion of the speculative state manager 135 that is invoked as part of execution of a thread, which is referred to as the self thread of the invocation. The logic shown in FIG. 6 works together with the logic in FIG. 5 to resolve conflicts.

Referring again to FIG. 6, control begins at block 600. Control then continues to block 605 where the speculative state manager 135 attempts to commit the transaction. That is, the speculative state manager 135 requests the chip 101 to copy the buffered data for the self thread (which the transaction code wrote) from the cache 125 to the shared data 143 in the memory 102.

Control then continues to block 610 where the speculative state manager 135 determines whether the requested commit was successful. In an embodiment, the chip 101 performed the commit successfully if no conflicts existed between the self thread and any other thread. The commit failed if a conflict existed between the self thread and any other thread in the meantime. A conflict exists if in the conflict register record with a speculative thread identifier field 330 that matches the self thread, any one or more of the 1-conflict field 335, the more-than-1-conflict field 340, and the conflict-with-non-speculative field 345 indicate true. A conflict does not exist if in the conflict register record with a speculative thread identifier field 330 that matches the self thread, the 1-conflict field 335, the more-than-1-conflict field 340, and the conflict-with-non-speculative field 345 all indicate false.

If the determination at block 610 is true, then the commit operation for the self thread completed successfully, so control continues to block 699 where the logic of the speculative state manager 135 that executes in the self thread at the end of a transaction returns. The self thread then continues to execute any remaining transaction or non-transaction code, as previously described above with reference to FIG. 4.

If the determination at block 610 is false, then the commit operation failed, so control continues to block 615 where the speculative state manager 135 determines whether a conflict does not exist between the self thread and any other thread. If the determination at block 615 is true, then a conflict does not exist, so control returns to block 605, as previously described above. If the determination at block 615 is false, then a conflict does exist, so control continues to block 620 where the speculative state manager 135 waits for a period of time. Thus, if a conflict was detected during a previous attempt to commit the transaction of the self thread, which caused the previous attempt to fail, then the commit is attempted repeatedly until the commit is successful. Control then returns to block 615, as previously described above.

In an embodiment, the chip 101 may change the fields in the conflict register 148 for the self thread at any time, even during conflict resolution, as the various other threads execute. The interrupt handler 145 can also change the fields in the conflict register 148 by operation of the logic of block 535 (FIG. 5), where the self thread changes the 1-conflict field, or by operation of the logic of block 510 (FIG. 5), where an abort of a transaction in an enemy thread changes the 1-conflict field of the self thread, as previously described above. Thus, the logic of FIG. 6 causes the speculative state manager 135 executing in the self thread to wait for either the chip 101 or the interrupt handler 145 to change the fields in the conflict register 148 to indicate that no conflict exists, which then allows the commit operation to complete successfully.

Figure 7:
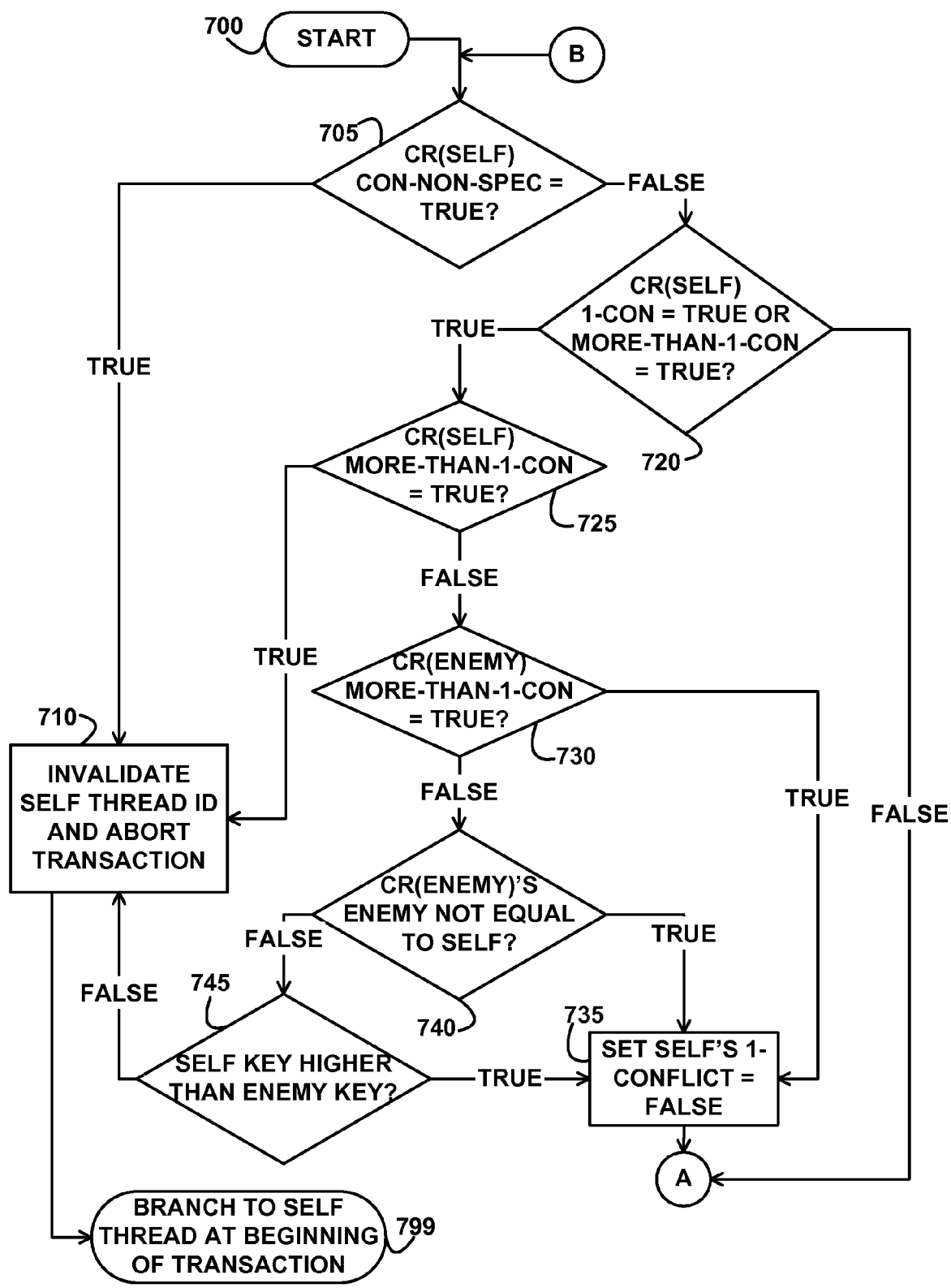
FIG. 7 depicts a flowchart of example processing for a speculative state manager responding to conflicts, according to an embodiment of the invention.

FIG. 7 depicts a flowchart of example processing for a speculative state manager responding to conflicts, according to an embodiment of the invention. FIG. 7 illustrates an embodiment where after the end of the transaction code 206 (FIG. 2) in a thread, the speculative state manager reads the conflict register and handles thread conflicts instead of the interrupt handler because conflict interrupts have been disabled. In an embodiment, FIG. 7 is particularly useful in a short running transaction because in a short running transaction, the transaction code 204 likely reaches the end of the transaction code before the conflict interrupts are received by the interrupt handler 145 if interrupts are enabled. The cache overflow and irrevocable action interrupts are handled by the interrupt handler and not by the speculative state manager in the logic of FIG. 7 because for cache overflow and irrevocable action conditions, the speculative state of a thread is such that it may no longer be able to reach the end of the transaction.

Control begins at block 700, in response to the transaction code 204 in a thread completing. The logic of FIG. 7 is reentrant, meaning that multiple instances of the logic of FIG. 7 may execute concurrently for multiple threads that have conflicts. The use of "self thread" when describing the logic of FIG. 7 refers to the current thread that contains the transaction code 204 that completed and caused the invocation or execution of the current instance of the logic of FIG. 7.

Control then continues to block 705 where the speculative state manager 135 determines whether the self thread conflicts with a non-speculatively executed thread. That is, the speculative state manager 135 determines whether the conflict register record with a speculative thread identifier 330 that matches the thread identifier of the self thread contains a conflict-with-non-speculative field 345 containing a value that indicates true.

If the determination at block 705 is true, then the self thread conflicts with a non-speculatively executed thread, so control continues to block 710 where the speculative state manager 135 invalidates the thread identifier of the self thread and aborts the transaction that was executed in the self thread prior to the executing of the instance of the logic of FIG. 7. The cache controller 130 discards the data that the aborted transaction wrote to the cache 125, and the chip 101 does not copy the data to the memory 102. If the transaction has been aborted (more than a threshold number of times), then the speculative state manager 135 increases the priority of the key of the self thread; otherwise, the speculative state manager does not change the priority of the key. Increasing the priority of the key increases the probability that the self thread succeeds in the next retry (the next invocation of the speculative state manager for the self thread) when the key of the self thread is compared to the key of the enemy thread by the logic of block 745.

Invalidating the thread identifier of the self thread causes the chip 101 to clear the 1-conflict field 335 of the conflict register record of the enemy of the self thread. That is, the chip 101 finds a first conflict register record whose speculative thread identifier field 330 matches the identifier of the self thread and finds a second conflict register record whose speculative thread identifier field 330 matches the enemy thread identifier field 350 of the first conflict register record. The chip 101 then sets the 1-conflict field 335 of the second conflict register record to indicate false.

Control then continues to block 799 where the speculative state manager 135 restarts the self thread at the beginning of the transaction that was aborted. That is, the speculative state manager 135 sets the instruction pointer of the processor (which indicates the next instruction to execute) that was executing the self thread to point to the address of the instructions that recover the necessary registers. Those instructions are inserted by the compiler into the beginning of the transaction to recover the necessary registers. Then the speculative state manager 135 executing in the start transaction code 202 of the self thread obtains a new speculative thread identifier and the transaction that was aborted is executed again. In an embodiment, if the key of the self thread exceeds a threshold value, the speculative state manager 135 changes the self thread to execute non-speculatively, in order to guarantee progress of the execution of the transaction during the next thread execution. If more than one concurrent transaction wishes to execute non-speculatively, the threads in which the non-speculative transaction execute contend for locks on the transaction (which ensures the shared storage locations that the non-speculative transactions all access are only been accessed by one thread at a time), in order to ensure that the non-speculative transactions execute sequentially and atomically. If the key of the self thread does not exceed the threshold value, then the self thread executes speculatively.

If the determination at block 705 is false, then the self thread does not conflict with a non-speculatively executed thread, so control continues to block 720 where the speculative state manager 135 determines whether the self thread conflicts with only one speculatively-executed thread or whether the self thread conflicts with more than one speculatively-executed thread. That is, the speculative state manager 135 determines whether the conflict register record with a speculative thread identifier field 330 whose value matches the self thread identifier contains a 1-conflict field 335 whose value indicates true or contains a more-than-1-conflict field 340 whose value indicates true.

If the determination at block 720 is true, then the self thread conflicts with only one speculatively-executed thread or the self thread conflicts with more than one speculatively-executed thread, so control continues to block 725 where the speculative state manager 135 determines whether the self thread conflicts with more than one speculatively-executed thread. That is, the speculative state manager 135 determines whether the conflict register record with a speculative thread identifier field 330 whose value matches the self thread identifier contains a more-than-1-conflict field 340 whose value indicates true.

If the determination at block 725 is true, then the self thread conflicts with more than one speculatively-executed thread, so control continues to blocks 710 and 799, where the self thread identifier is invalidated, the transaction is aborted, and the self thread is restarted, as previously described above. Thus, all threads that are involved in multiple conflicts are aborted.

If the determination at block 725 is false, then the self thread conflicts with only one speculatively-executed thread, so control continues to block 730 where the speculative state manager 135 determines whether the enemy thread of the self thread conflicts with more than one speculatively-executed thread. That is, the speculative state manager 135 finds the conflict register record with a value in the speculative thread identifier field 330 that matches the self thread, reads the enemy thread identifier value in the enemy thread identifier 350 of the same record, finds the conflict register record with a value in the speculative thread identifier field 330 that matches the selected enemy thread identifier value, and determines whether the more-than-1-conflict field 340 value of the selected enemy thread conflict register record indicates true.

If the determination at block 730 is true, then the enemy thread of the self thread conflicts with more than one speculatively-executed thread, so control continues to block 735 where the speculative state manager 135 sets the 1-conflict field 335 value of the conflict register record that has a speculative thread identifier field 330 value that matches the self thread identifier to indicate false. The logic of block 735 when executed by the self thread does not alter the conflict register of its enemy thread because when its enemy thread executes an instance of the speculative state manager logic of FIG. 7, that enemy thread independently arrives at its own decision to abort its own transaction.

Figure 8:
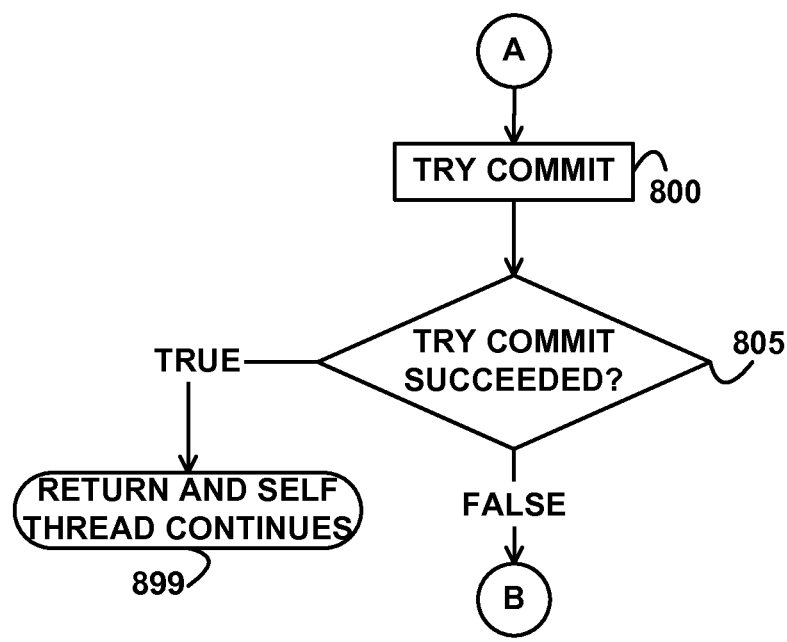
FIG. 8 depicts a flowchart of example processing for a speculative state manager performing a commit operation, according to an embodiment of the invention.

Control then continues to block 800 of FIG. 8 where the speculative state manager 135 attempts to commit the transaction. That is, the speculative state manager 135 requests the chip 101 to copy the buffered data for the self thread (which the transaction code 204 wrote) from the cache 125 to the shared data 143 in the memory 102. Control then continues to block 805 where the speculative state manager 135 determines whether the requested commit was successful. In an embodiment, the chip 101 performed the commit successfully if no conflicts existed between the self thread and any other thread, and the commit failed if a conflict existed between the self thread and any other thread. A conflict exists if in the conflict register record with a speculative thread identifier field 330 that matches the self thread, any one or more of the 1-conflict field 335, the more-than-1-conflict field 340, and the conflict-with-non-speculative field 345 indicate true. A conflict does not exist if the conflict register record with a speculative thread identifier field 330 that matches the self thread has a 1-conflict field 335, a more-than-1-conflict field 340, and a conflict-with-non-speculative field 345 that all indicate false.

If the determination at block 805 is true, then the commit for the self thread completed successfully, so control continues to block 899 where the instance of the logic of the speculative state manager 135 that executes in the self thread at the end of a transaction returns. The self thread then continues to execute any remaining transaction or non-transaction code, as previously described above with reference to FIG. 4.

If the determination at block 805 is false, then the commit operation failed, so control returns to block 705 of FIG. 7, where the speculative state manager 135 once again begins examining and processing the conflict register record for the self thread, as previously described above.

If the determination at block 730 is false, then the enemy thread of the self thread does not conflict with more than one speculatively-executed thread, so control continues to block 740 where the speculative state manager 135 determines whether the enemy of the self thread's enemy thread is not equal to the self thread. That is, the speculative state manager 135 finds a first conflict register record with a value in the speculative thread identifier field 330 that matches the self thread identifier, reads a first enemy thread identifier value in the enemy thread identifier 350 of the first conflict register record, finds a second conflict register record with a value in the speculative thread identifier field 330 that matches the first enemy thread identifier value and determines whether a second enemy thread identifier value in the enemy thread identifier field 350 of the second conflict register record is not the same as the self thread. Using the example of FIG. 3, if the self thread is thread C, the enemy thread of thread C is thread D, as illustrated in record 315. But, the enemy of thread D is thread B (as illustrated in record 320) and not thread C, so the determination at block 740 would be true, in this example, because the enemy of the self thread's enemy is not the self thread.

If the determination at block 740 is true, then the enemy of the self thread's enemy is not the self thread, so control continues to block 735 followed by block 800 of FIG. 8, as previously described above.

Referring again to FIG. 7, if the determination at block 740 is false, then the enemy thread of the self thread's enemy is the self thread, so control continues to block 745 where the speculative state manager 135 determines whether the key of the self thread is larger (indicates a higher priority) than the key of the thread that is the enemy of the self thread.

If the determination at block 745 is true, then the key of the self thread indicates a higher priority than does the key of the enemy thread of the self thread, so control continues to block 735, followed by block 800 of FIG. 8, as previously described above.

Referring again to FIG. 7, if the determination at block 745 is false, then the self key value does not have a higher priority than the key of the thread that is the enemy of the self thread, so control continues to block 710, followed by block 799, as previously described above.

If the determination at block 720 is false, then the self thread does not conflict with only one speculatively-executed thread and the self thread does not conflict with more than one speculatively-executed thread, so control continues to block 800 of FIG. 8, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A non-transitory computer-readable storage medium encoded with instructions, wherein the instructions when executed comprise:

if a self thread has more than one conflict, aborting and restarting a transaction of the self thread;

if the self thread has only one conflict and an enemy thread of the self thread has more than one conflict, committing the transaction of the self thread;

if the self thread only conflicts with the enemy thread and the enemy thread only conflicts with the self thread and the self thread has a key that has a higher priority than a key of the enemy thread, committing the transaction of the self thread; and if the self thread only conflicts with the enemy thread and the enemy thread only conflicts with the self thread and the self thread has a key that has a lower priority than the key of the enemy thread, aborting the transaction of the self thread.

2. The non-transitory computer-readable storage medium of claim 1, further comprising:
   if the transaction of the self thread has been aborted more than a threshold number of times, increasing a priority of the key of the self thread.

3. The non-transitory computer-readable storage medium of claim 2, further comprising:
   if the priority of the key of the self thread exceeds a threshold value, executing the self thread non-speculatively.

4. The non-transitory computer-readable storage medium of claim 1, further comprising:
   if the self thread has only one conflict, the enemy thread of the self thread has only one conflict, and the self thread does not conflict with the enemy thread, committing the transaction of the self thread.

5. The computer-readable non-transitory storage medium of claim 1, wherein the only one conflict was detected during a previous committing of the transaction of the self thread and wherein detection of the only one conflict during the previous committing of the transaction of the self thread caused the previous committing to fail.

6. The non-transitory computer-readable storage medium of claim 1, wherein the committing the transaction of the self thread comprises copying data written by speculative execution of the self thread from a cache to memory.

7. The non-transitory computer-readable storage medium of claim 6, wherein the aborting the transaction of the self thread comprises discarding the data written by the speculative execution of the self thread from the cache and not copying the data from the cache to the memory.

8. A non-transitory computer-readable storage medium encoded with instructions, wherein the instructions when executed comprise:
   if a self thread has more than one conflict, aborting and restarting a transaction of the self thread;
   if the self thread has only one conflict and an enemy thread of the self thread has more than one conflict, committing the transaction of the self thread;
   if the self thread only conflicts with the enemy thread and the enemy thread only conflicts with the self thread and the self thread has a key that has a higher priority than a key of the enemy thread, committing the transaction of the self thread; and
   if the self thread only conflicts with the enemy thread and the enemy thread only conflicts with the self thread and the self thread has a key that has a lower priority than the key of the enemy thread, aborting the transaction of the self thread, wherein the committing the transaction of the self thread comprises copying data written by speculative execution of the self thread from a cache to memory, and
   wherein the conflict occurs when the self thread and the enemy thread attempt to access a same location in the memory.

9. A computer system comprising:
   a chip comprising a cache and a core, wherein the chip speculatively executes a plurality of threads and stores data written by execution of the plurality of threads to the cache; and
   memory communicatively connected to the chip, wherein the memory is encoded with a conflict register and instructions, wherein the chip sends conflict status of the plurality of threads to the conflict register, and wherein the instructions when executed by the core comprise
   if the conflict status indicates that a self thread has more than one conflict, aborting and restarting a transaction of the self thread,
   if the conflict status indicates that the self thread has only one conflict and an enemy thread of the self thread has more than one conflict, committing the transaction of the self thread,
   if the conflict status indicates that the self thread only conflicts with the enemy thread and the enemy thread only conflicts with the self thread and the self thread has a key that has a higher priority than a key of the enemy thread, committing the transaction of the self thread, and
   if the conflict status indicates that the self thread only conflicts with the enemy thread and the enemy thread only conflicts with the self thread and the self thread has a key that has a lower priority than the key of the enemy thread, aborting the transaction of the self thread, wherein each of the plurality of threads executes an instance of the instructions and each instance of the instructions independently determines whether to perform the committing the transaction and the aborting the transaction for its respective self thread.

10. The computer system of claim 9, wherein the instructions further comprise:
    if the transaction of the self thread has been aborted more than a threshold number of times, increasing a priority of the key of the self thread.

11. The computer system of claim 10, wherein the instructions further comprise:
    if the priority of the key of the self thread exceeds a threshold value, executing the self thread non-speculatively.

12. The computer system of claim 9, wherein the instructions further comprise:
    if the conflict status indicates that the self thread has only one conflict, the enemy thread of the self thread has only one conflict, and the self thread does not conflict with the enemy thread, committing the transaction of the self thread.

13. The computer system of claim 9, wherein the only one conflict was detected during a previous committing of the transaction of the self thread and wherein detection of the only one conflict during the previous committing of the transaction of the self thread caused the previous committing of the transaction of the self thread to fail.

14. The computer system of claim 9, wherein the committing the transaction of the self thread comprises requesting the chip to copy the data written by execution of the self thread from the cache to the memory.

15. The computer system of claim 9, wherein the aborting the transaction of the self thread comprises requesting the chip to discard the data written by execution of the self thread from the cache and not copying the data from the cache to the memory.

16. The computer system of claim 9, wherein an interrupt handler comprises the instructions, wherein the interrupt handler receives a conflict interrupt from the chip, and wherein the conflict interrupt indicates that execution of the self thread has encountered at least one conflict.

17. The computer system of claim 16, wherein a speculative state manager comprises the instructions, wherein an instance of the speculative state manager executes in the self thread and reads the conflict status from the conflict register after execution of transaction code in the self thread that performs the transaction.

18. The computer system of claim 17, wherein the instructions further comprise:

enabling the chip to raise the conflict interrupt if an estimated execution time of the transaction exceeds an estimated time for the conflict interrupt to reach the interrupt handler.

19. The computer system of claim 18, wherein the instructions further comprise:
disabling the chip from raising the conflict interrupt if the estimated execution time of the transaction is less than the estimated time for the conflict interrupt to reach the interrupt handler.

20. The computer system of claim 9, wherein the conflict occurs when the self thread and the enemy thread attempt to access a same location in the memory.

* * * * *